United States Patent
Shirahata (10) Patent No.: US 11,615,106 B2
(45) Date of Patent: Mar. 28, 2023

(54) NON-TRANSITORY COMPUTER-READABLE STORAGE MEDIUM STORING PROGRAM FOR PERFORMING TIME-SERIES ANALYSIS BY CALCULATING APPROXIMATION CALCULATION APPLICATION DEGREE, TIME-SERIES ANALYSIS METHOD FOR PERFORMING TIME-SERIES ANALYSIS BY CALCULATING APPROXIMATION CALCULATION APPLICATION DEGREE, AND INFORMATION PROCESSING APPARATUS FOR PERFORMING TIME-SERIES ANALYSIS BY CALCULATING APPROXIMATION CALCULATION APPLICATION DEGREE

(71) Applicant: FUJITSU LIMITED, Kawasaki (JP)

(72) Inventor: Koichi Shirahata, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 148 days.

(21) Appl. No.: 17/228,759

(22) Filed: Apr. 13, 2021

(65) Prior Publication Data

US 2021/0382891 A1    Dec. 9, 2021

(30) Foreign Application Priority Data

Jun. 8, 2020 (JP) .............................. JP2020-099274

(51) Int. Cl.
*G06F 16/00* (2019.01)
*G06F 16/2458* (2019.01)
*G06F 16/22* (2019.01)

(52) U.S. Cl.
CPC ...... *G06F 16/2477* (2019.01); *G06F 16/2272* (2019.01); *G06F 16/2474* (2019.01)

(58) Field of Classification Search
None
See application file for complete search history.

(56) References Cited

U.S. PATENT DOCUMENTS 10,366,095 B2 * 7/2019 Chen ..................... G06F 16/287
2019/0163680 A1 * 5/2019 Mizoguchi .......... G06F 16/2474
(Continued)

FOREIGN PATENT DOCUMENTS

JP        2016-105240 A      6/2016

OTHER PUBLICATIONS

Stelios Sidiroglou et al., "Managing Performance vs. Accuracy Trade-offs With Loop Perforation", Computer Science and Artificial Intelligence Laboratory Massachusetts Institute of Technology, ESEC/FSE'11, Sep. 5-9, 2011, Szeged, Hungary (Total 11 pages).
(Continued)

*Primary Examiner* — Debbie M Le
(74) *Attorney, Agent, or Firm* — Fujitsu Patent Center (57) ABSTRACT

A non-transitory computer-readable storage medium storing a program that causes a processor to execute a process. The process includes selecting a section from among a plurality of sections, performing on an input data group the time-series analysis from a top section to the section when each of a plurality of approximation application degrees is set in the section, based on a result of the performing, for each of the plurality of approximation application degrees is set, calculating an error and an index value for a result of the time-series analysis when an approximation calculation is not applied, the index value indicating a degree of speed-up, storing an approximation application degree in which the error falls within a range, and the index value obtained when the error falls within the range, and executing the time-series analysis on an another input data group by applying a combination of the approximation application degrees.

11 Claims, 10 Drawing Sheets

(56) References Cited

U.S. PATENT DOCUMENTS

2020/0065213 A1\* 2/2020 Poghosyan ......... G06F 11/3409
2021/0165770 A1\* 6/2021 Qingsong ............. G06F 16/215

OTHER PUBLICATIONS

Extended European Search Report dated Oct. 7, 2021 for corresponding European Patent Application No. 21168552.4, 11 pages.
\*\*\*Please Note NPL "Stelios Sioiroglou-Oouskos et al: "Managing performance vs. accuracy trade-offs with loop perforation". . . ", cited herewith, was previously cited in an IDS filed on Apr. 13, 2021.\*\*\*
Milanovic, Marina et al., "Algorithmic methods for segmentation of time series: An overview", XP055606452, Retrieved from the Internet: URL:https://www.researchgate.net/profile/Milan_Stamenkovic/publication/317099241_Algorithmic_methods_for_segmentation_of_time_series_An_overview/links/5925fc96458515e3d4537b5f/Algorithmic-methods-for-segmentation-of-time-series-An-overview.pdf [retrieved on Jul. 17, 2019], vol. 1, JCEBI, pp. 31-53, Jan. 31, 2014.

\* cited by examiner

NON-TRANSITORY COMPUTER-READABLE STORAGE MEDIUM STORING PROGRAM FOR PERFORMING TIME-SERIES ANALYSIS BY CALCULATING APPROXIMATION CALCULATION APPLICATION DEGREE, TIME-SERIES ANALYSIS METHOD FOR PERFORMING TIME-SERIES ANALYSIS BY CALCULATING APPROXIMATION CALCULATION APPLICATION DEGREE, AND INFORMATION PROCESSING APPARATUS FOR PERFORMING TIME-SERIES ANALYSIS BY CALCULATING APPROXIMATION CALCULATION APPLICATION DEGREE

CROSS-REFERENCE TO RELATED APPLICATION

This application is based upon and claims the benefit of priority of the prior Japanese Patent Application No. 2020-99274, filed on Jun. 8, 2020, the entire contents of which are incorporated herein by reference.

FIELD

The embodiments discussed herein are related to a non-transitory computer-readable storage medium, a time-series analysis method, and an information processing apparatus.

BACKGROUND

A time-series analysis in which an analysis is started from a certain initial state and sequentially performed at a plurality of time points (time steps) to obtain a result is performed for, for example, weather forecast or the like.

In some cases, approximation calculation is used to speed up calculation in the time-series analysis. As an example of the approximation calculation, there exists a method in which the number of repetitions of loop processing included in a program is decreased (referred to as loop perforation). The degree by which the number of repetitions is decreased is also referred to as a skip rate. Other examples of the approximation calculation include a method by which a data structure is converted into a data structure having a small number of bits and a method called synchronization relaxation. The synchronization relaxation is a method in which, in parallel computing or the like, execution of the program is advanced by synchronizing threads and processes that arrive at a certain synchronization point of the program within a certain period of time and arrival of other threads or processes at the synchronization point is not waited.

There exists a related-art method in which a program is executed by applying a plurality of skip rates to each of a plurality of loop processes of candidate to which approximation calculation is applied, and searching for an appropriate combination from the relationship between the error and the speed-up rate out of combinations of the skip rates to be applied (see, for example, "Managing Performance vs. Accuracy Trade-offs With Loop Perforation", ESEC/FSE'11, 2011).

Also, as an approximation method for time-series data, there exists a method in which a time step with which an approximation error is minimized is searched out of a plurality of time steps (see, for example, Japanese Laid-open Patent Publication No. 2016-105240).

Related techniques are disclosed in for example Japanese Laid-open Patent Publication No. 2016-105240, and "Managing Performance vs. Accuracy Trade-offs With Loop Perforation", ESEC/FSE'11, 2011.

SUMMARY

According to an aspect of the embodiments, a non-transitory computer-readable storage medium storing a program that causes a processor included in an apparatus to execute a process, the process includes: selecting a single section from among a plurality of sections obtained by dividing a predetermined number of time steps in a time-series analysis from a top section or a last section toward an analysis end time point side or an analysis start time point side; performing on a first input data group the time-series analysis from the top section to the selected section when each of a plurality of approximation calculation application degrees indicating a degree of application for approximation calculation in the time-series analysis is set in the selected section; based on a result of the time-series analysis on the first input data group, for each of the plurality of approximation calculation application degrees is set, calculating an error and an index value for a result of the time-series analysis up to the selected section for the first input data grope when the approximation calculation is not applied, the index value indicating a degree of speed-up of an analysis; storing, in a memory, an approximation calculation application degree in which the error falls within a predetermined range out of the plurality of approximation calculation application degrees, and the index value obtained when the error falls within the predetermined range; and executing the time-series analysis on a second input data group by applying a combination of the approximation calculation application degrees, each of the approximation calculation application degrees includes in the combination correspond to an index value which indicates a highest degree of speed-up in a corresponding one of the plurality of sections out of the index values held in the storage unit The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the related art, in the time-series analysis, even when the intensity of approximation calculation (degree of approximation such as the above-described skip rate) with a certain degree of appropriateness is set for a certain period, it is not necessarily appropriate in another period, and the speed up of the calculation is not necessarily sufficiently obtained.

According to one aspect, an object of the present disclosure is to provide a time-series analysis program, a time-series analysis method, and an information processing apparatus that enable speed-up of the time-series analysis.

Hereafter, embodiments of the present disclosure are described with reference to the drawings.

Figure 1:
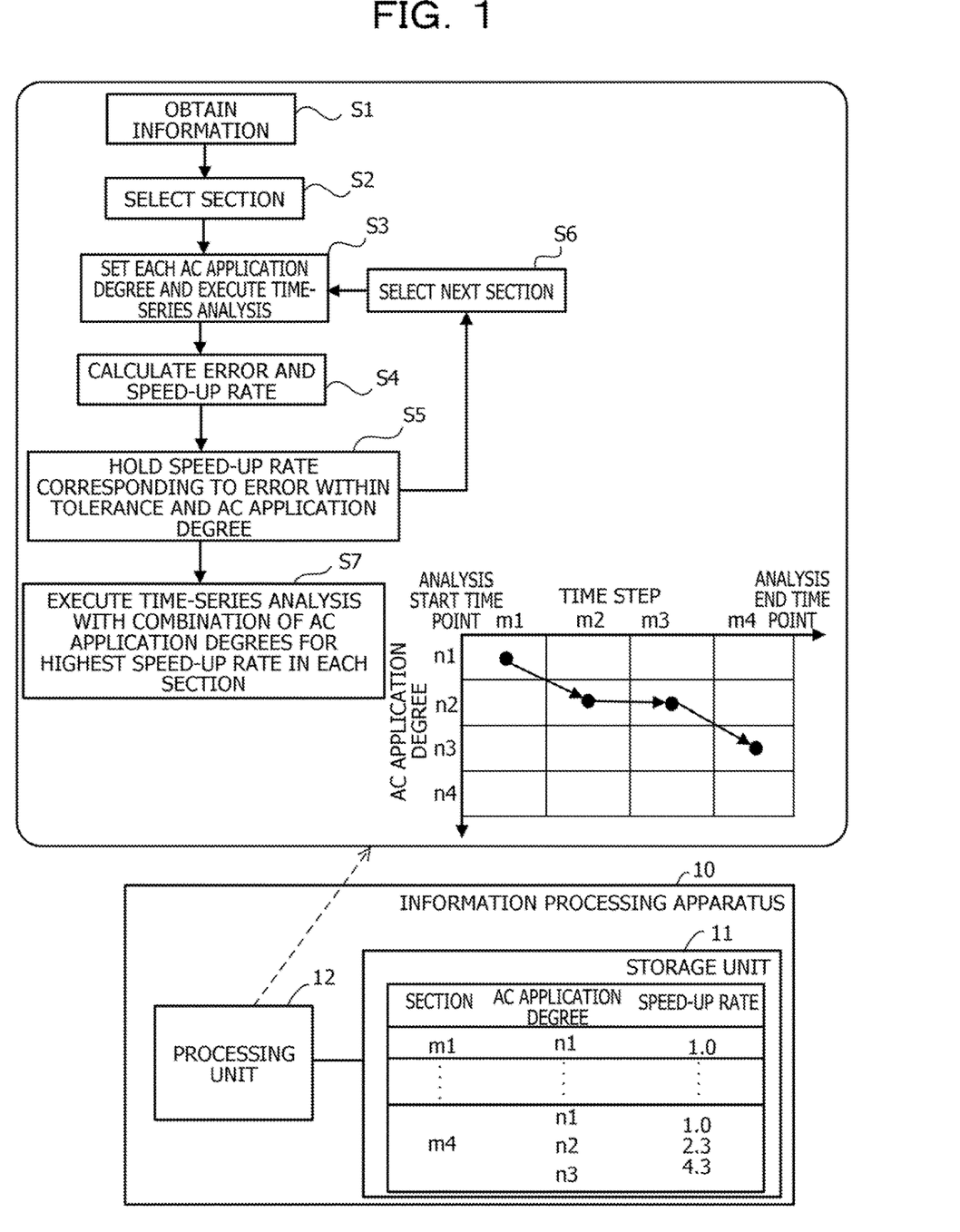
FIG. 1 is a diagram illustrating examples of an information processing apparatus and a method for a time-series analysis according to a first embodiment.

FIG. 1 illustrates examples of an information processing apparatus and a time-series analysis method according to a first embodiment.

An information processing apparatus 10 executes a time-series analysis, such as, for example, a time development simulation such as weather forecast or a simulation of convergent calculation using a genetic algorithm.

The information processing apparatus 10 includes a storage unit 11 and a processing unit 12.

The storage unit 11 is, for example, a volatile storage device such as a random-access memory (RAM) or a non-volatile storage device such as a hard disk drive (HDD) or a flash memory.

The storage unit 11 stores, for example, an input data group (hereafter, referred to as an input data set) to be subjected to the time-series analysis, various types of data obtained during the time-series analysis, results of the time-series analysis, and the like.

The processing unit 12 is realized by a processor being hardware such as a central processing unit (CPU) or a graphics processing unit (GPU). The processing unit 12 may include an electronic circuit such as an application-specific integrated circuit (ASIC) or a field-programmable gate array (FPGA). The processor executes programs stored in memory such as the RAM. For example, a time-series analysis program is executed. A set of the plurality of processors may be referred to as a "multiprocessor" or simply a "processor".

The processing unit 12 performs the following processes (a time-series analysis method).

First, the processing unit 12 obtains various types of information used for execution of the time-series analysis (step S1). Examples of the information to be obtained include, for example, analytical conditions such as a predetermined number of time steps, a tolerance of an error (accuracy requested by a user), a division number of an approximate computing (AC) application degree, a division number of the predetermined number of time steps, and an input data set to be subjected to the time-series analysis.

The above-described number of time steps is the number of execution steps of the time-series analysis defined in the time-series analysis program. The AC application degree represents the degree of application of approximation calculation (approximation strength) in the time-series analysis. For example, when loop perforation is applied as the approximation calculation method, a skip rate may be used as the AC application degree. As the skip rate increases, because the number of times of a loop process decreases, the degree of application of the approximation calculation increases. When synchronization relaxation is applied as the approximation calculation method, for example, a ratio of threads or processes that wait for arrival of the program at a certain synchronization point may be used as the AC application degree. As this ratio decreases, because the number of threads or processes the arrival of which at the synchronization point is not waited increases, the degree of application of the approximation calculation increases.

As an input data set to be subjected to the time-series analysis, for example, weather data at a certain time point is used for the time-series analysis such as weather forecast or the like and data in an initial state is used for a fluid analysis or the like.

The above-described various types of information obtained by the processing unit 12 may be, for example, information input through operation performed by the user with an input device, information input via a network, or information stored in advance in the storage unit 11.

The processing unit 12 sequentially selects a single section among a plurality of sections (time-series sections) from a top section or a last section toward an analysis end time point side or an analysis start time point side. The sections are obtained by dividing the number of time steps by the obtained division number (step S2).

The processing unit 12 performs on the obtained input data set from the top section to the selected section a time-series analysis in which a plurality of AC application degrees calculated based on the obtained division number are set to the selected section such that the plurality of AC application degrees are each set to the selected section (step S3).

The processing unit 12 may obtain the plurality of AC application degrees in a process in step S1 instead of calculating the plurality of AC application degrees from a single AC application degree by dividing based on the division number.

In the case where a single section is sequentially selected from the top section toward the analysis end time point side, the processing unit 12 may set, for a section temporally previous to the selected section, the AC application degree stored in the storage unit 11 by processing to be described later. In the case where a single section is sequentially selected from the last section toward the analysis start time point side, the processing unit 12 may set a predetermined initial value of the AC application degree determined in advance for a section temporally previous to the selected section.

Furthermore, based on a result of the time-series analysis in step S3, the processing unit 12 calculates an error and an index value indicating the degree of speed-up of the analysis (speed-up rate in the example of FIG. 1) for the result of the time-series analysis on the input data set for the case where the approximation calculation is not applied (step S4). The time-series analysis for the case where the approximation calculation is not applied is performed in advance, and an analytical result (including execution time) at the end of the analysis of each section is stored in the storage unit 11. Based on this analytical result, the error and the speed-up rate in the case where the approximation calculation is applied are calculated.

As the error, a mean absolute error, a mean square error, or the like may be used. The speed-up rate may be represented by a ratio between the execution time in the case where the approximation calculation is applied and the execution time in the case where the approximation calculation is not applied. The processing unit 12 calculates the error and the speed-up rate for each of the plurality of AC application degrees set for the selected section.

The index value indicating the degree of the speed-up is not limited to the speed-up rate.

Out of the plurality of the set AC application degrees, the processing unit 12 holds in the storage unit 11 the AC application degree set for the section selected in the time-series analysis in which the error falls within a predetermined range and the speed-up rate obtained when the error falls within the predetermined range (step S5). The predetermined range is, for example, a tolerance of the error obtained in the process in step S1. The predetermined range may vary from section to section.

Then, the processing unit 12 selects the next section (step S6) and repeats the processes in steps S3 to S5. For example, the number of set sections is four, the processing unit 12 repeats the processes in steps S3 to S5 four times.

The processing unit 12 executes a time-series analysis on a new input data set by applying a combination of the AC application degrees corresponding to the speed-up rates each indicating a highest degree of speed-up in a corresponding one of the plurality of sections out of the speed-up rates held in the storage unit 11 (step S7). For example, in a time-series analysis such as weather forecast, when weather data at a certain time point is obtained in the process in step S1, the new input data set is weather data at a different time point from the certain time point. The new input data set may be obtained in advance in the process in step S1.

FIG. 1 illustrates an example of setting of four AC application degrees n1, n2, n3, and n4 for the sections m1, m2, m3, and m4 obtained by dividing the number of time steps into four. The horizontal axis represents the time step, and the vertical axis represents the AC application degree. Here, n1<n2<n3<n4.

FIG. 1 also illustrates examples of the AC application degrees and the speed-up rates corresponding to the AC application degrees held in the storage unit 11 in the process in step S5. For example, for the section m1, the AC application degree n1 and a speed-up rate (1.0) corresponding to the AC application degree n1 are held. For the section m4, the AC application degree n1 and the speed-up rate (1.0) corresponding to the AC application degree n1, the AC application degree n2 and a speed-up rate (2.3) corresponding to the AC application degree n2, and the AC application degree n3 and a speed-up rate (4.3) corresponding to the AC application degree n3 are held. For the section m1, when the AC application degrees n2 to n4 other than the AC application degree n1 are set, the error is out of the predetermined range. Thus, the speed-up rate to be held is one. In the other hand, for the section m4, even when any of the AC application degrees n1 to n3 is set, the error falls within the predetermined range. Thus, three speed-up rates are held.

In such examples, the AC application degree set for the section m1 applied to a process in step S7 is n1, and the AC application degree set for the section m4 applied to the process in step S7 is n3 with which the largest speed-up rate is obtained.

A plurality of input data sets may be obtained in the process in step S1, the processes in steps S3 and S4 may be executed on each of the input data sets, and the error and the speed-up rate may be average values when the plurality of input data sets are used. An example in which a plurality of input data sets are used will be described later.

With the information processing apparatus 10 and the time-series analysis method as described above, the time-series calculation is performed with the plurality of AC application degrees set for each of the time-series sections, and the combination of the AC application degrees with which the speed-up rate is the highest in the range where the error falls within the predetermined range is searched. Accordingly, when the time-series analysis is performed by applying to a new input data set the combination of the AC application degrees searched as described above, both the speed-up of the time-series analysis and the limiting of the error to a range requested by the user may be realized.

Second Embodiment

Next, a second embodiment is described.

Figure 2:
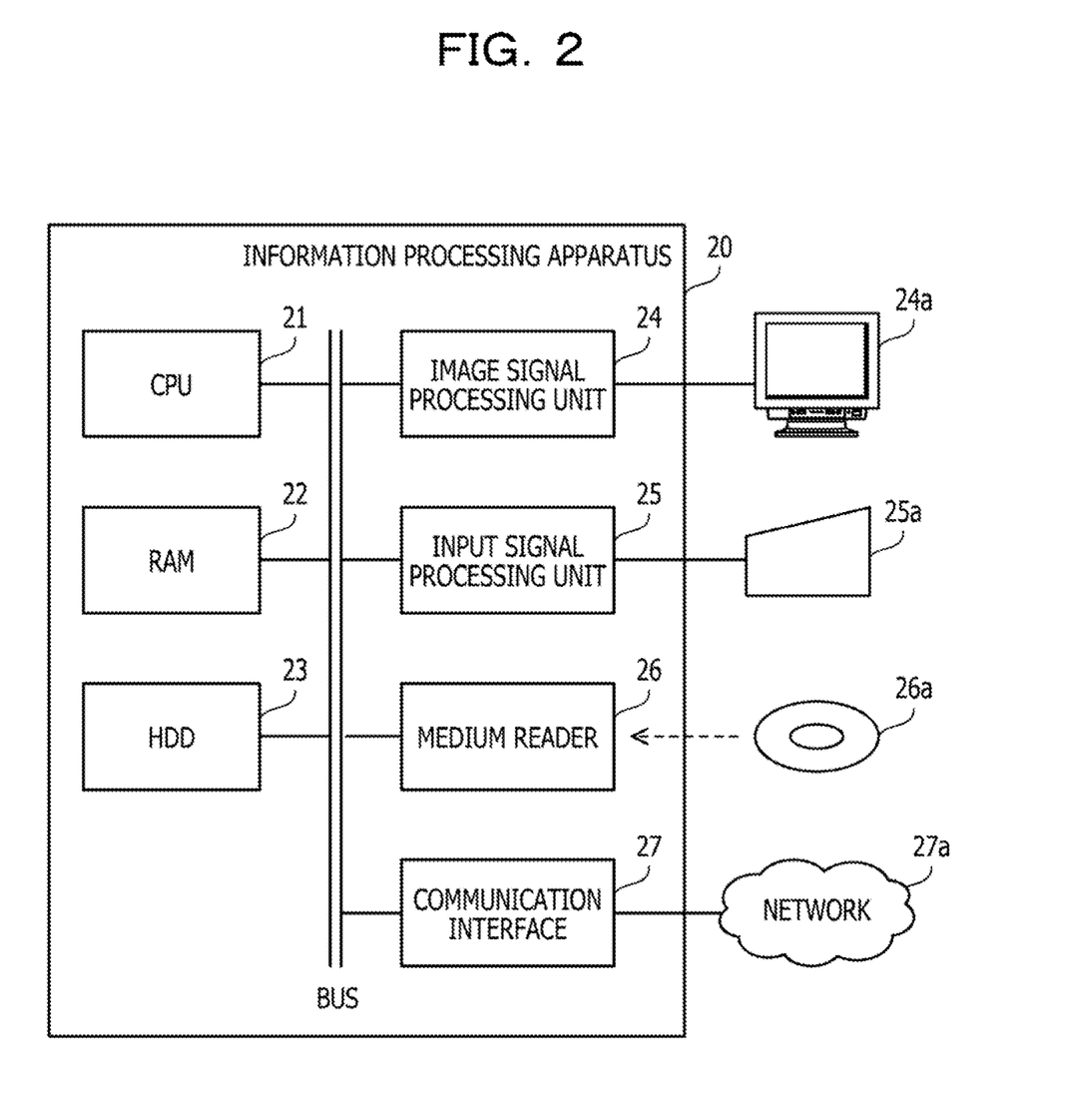
FIG. 2 is a block diagram illustrating an examples of hardware of the information processing apparatus.

FIG. 2 is a block diagram illustrating an example of hardware of the information processing apparatus.

An information processing apparatus 20 includes a CPU 21, a RAM 22, an HDD 23, an image signal processing unit 24, an input signal processing unit 25, a medium reader 26, and a communication interface 27. The above-described units are coupled to a bus.

The CPU 21 is a processor including an operational circuit that executes instructions of the programs. The CPU 21 loads at least some of the programs and items of data stored in the HDD 23 onto the RAM 22 and executes the program. The CPU 21 may include a plurality of processor cores, the information processing apparatus 20 may include a plurality of processors, and processes described below may be executed in parallel by using a plurality of processors or processor cores. A set of the plurality of processors (multiprocessor) may be referred to as a "processor".

The RAM 22 is a volatile semiconductor memory that temporarily stores programs to be executed by the CPU 21 and data used for operation by the CPU 21. The information processing apparatus 20 may include a type of memory other than the RAM and may include a plurality of memories.

The HDD 23 is a non-volatile storage device that stores software programs such as an operating system (OS), middleware, and application software. The HDD 23 also stores data. The programs include, for example, the time-series analysis program that causes the information processing apparatus 20 to execute the time-series analysis. The information processing apparatus 20 may include other types of storage devices such as a flash memory and a solid-state drive (SSD) and may include a plurality of non-volatile storage devices.

The image signal processing unit 24 outputs an image to a display 24a coupled to the information processing apparatus 20 in accordance with an instruction from the CPU 21. As the display 24a, a cathode ray tube (CRT) display, a liquid crystal display (LCD), a plasma display panel (PDP), an organic electro-luminescence (OEL) display or the like may be used.

The input signal processing unit 25 obtains an input signal from an input device 25a coupled to the information processing apparatus 20 and outputs the input signal to the CPU 21. The input device 25a may include, for example, a keyboard, a remote controller, a button switch, and a pointing devices such as a mouse, a touch pad, a touch panel, a trackball, or the like. Further, a plurality of types of input devices may be coupled to the information processing apparatus 20.

The medium reader 26 is a reading device that reads the programs or the data recorded on a recording medium 26a. As the recording medium 26a, for example, a magnetic disk, an optical disk, a magneto-optical disk (MO), a semiconductor memory, or the like may be used. The magnetic disk include a flexible disk (FD), an HDD, and/or the like.

Examples of the optical disk include a compact disc (CD), a digital versatile disc (DVD), and/or the like.

The medium reader 26 copies the programs and the data read from the recording medium 26a to another recording medium such as the RAM 22 or the HDD 23, for example. The read programs are executed by, for example, the CPU 21. The recording medium 26a may be a portable recording medium. In some cases, the recording medium 26a is used to distribute the programs or the data. The recording medium 26a and the HDD 23 may be referred to as computer-readable recording media.

The communication interface 27 is an interface that is connected to a network 27a and communicates with another information processing apparatus via the network 27a. The communication interface 27 may be a wired communication interface connected to a communication device such as a switch via a cable or may be a wireless communication interface connected to a base station via a wireless link.

Next, functions and a processing procedure of the information processing apparatus 20 is described.

Figure 3:
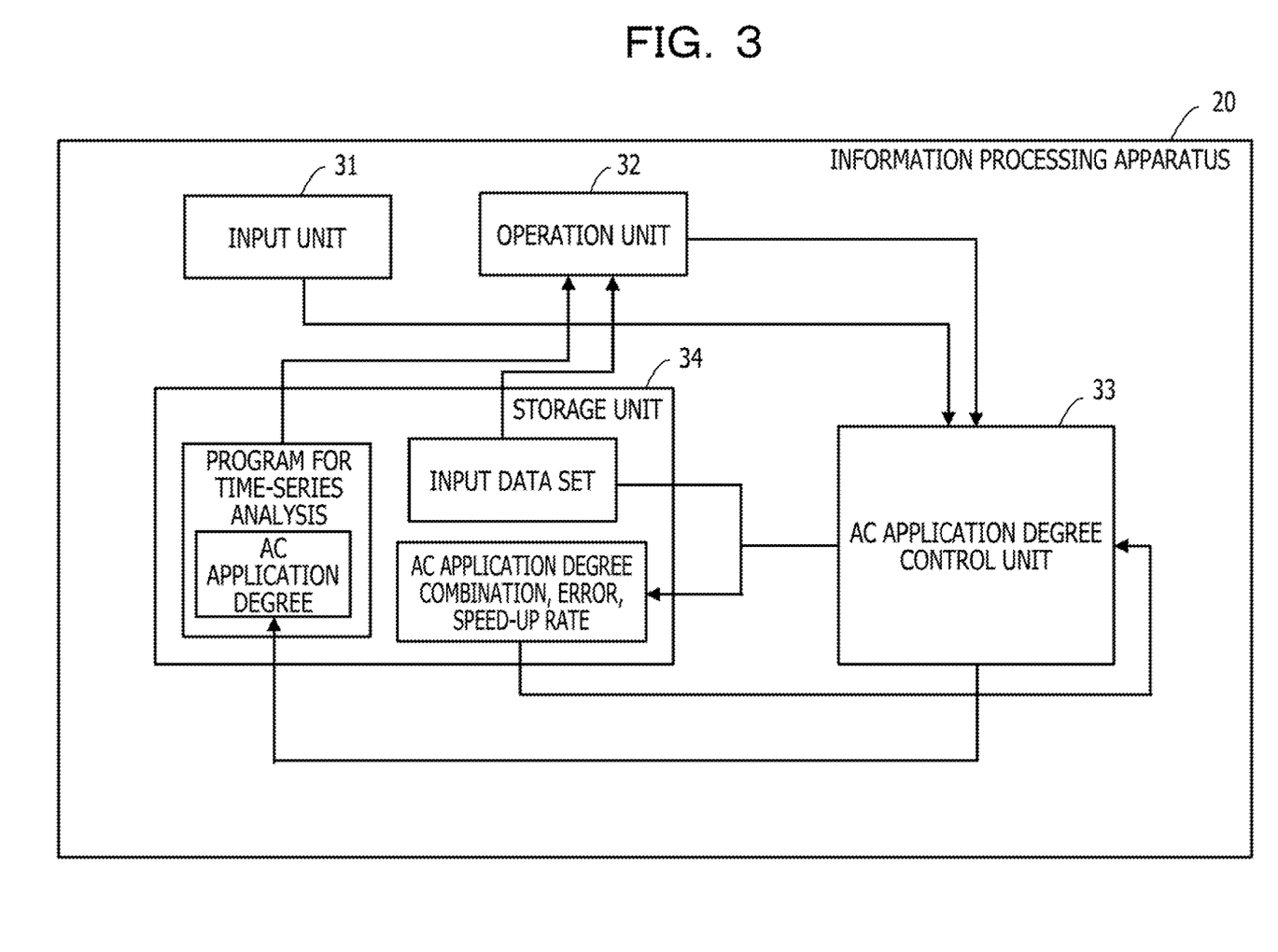
FIG. 3 is a block diagram illustrating examples of functions of the information processing apparatus.

FIG. 3 is a block diagram illustrating examples of the functions of the information processing apparatus.

The information processing apparatus 20 includes an input unit 31, an operation unit 32, an AC application degree control unit 33, and a storage unit 34.

The input unit 31, the operation unit 32, and the AC application degree control unit 33 may be implemented by using, for example, program modules executed by the CPU 21. The input unit 31, the operation unit 32, and the AC application degree control unit 33 realize similar functions to those of the processing unit 12 of the information processing apparatus 10 according to the first embodiment. The storage unit 34 may be implemented by using, for example, a storage area allocated in the RAM 22 or the HDD 23. The storage unit 34 corresponds to the storage unit 11 of the information processing apparatus 10 according to the first embodiment.

The input unit 31 obtains, for example, analytical conditions such as a predetermined number of time steps, the tolerance of the error (accuracy requested by the user), the division number of the AC application degree, the predetermined division number of the number time steps, and the like input through operation performed by the user on the input device 25a.

The operation unit 32 executes the time-series analysis.

The AC application degree control unit 33 calculates a plurality of AC application degrees based on the division number of the AC application degree having been input and divides the predetermined number of time steps into a plurality of sections based on the division number of the number of time steps having been input. The AC application degree control unit 33 sets the AC application degree for each of the plurality of sections. The AC application degree control unit 33 selects an input data set to be subjected to the time-series analysis and calculates the error and the speed-up rate based on a result of the time-series analysis.

The storage unit 34 stores the time-series analysis program, a plurality of input data sets subjected to the time-series analysis, the combinations of the AC application degrees set for respective sections, and the error and the speed-up rate produced by the time-series analysis executed by using the set AC application degree. The storage unit 34 also stores the analytical result (including the execution time) of the time-series analysis for each input data set in the case where the approximation calculation is not performed.

The plurality of input data sets are, for example, weather data at a plurality of time points in the time-series analysis such as weather forecast.

Hereafter, three examples of the flow of processes of the time-series analysis method with the information processing apparatus 20 as described above are described.

(First Example of the Time-Series Analysis)

Figure 4A:
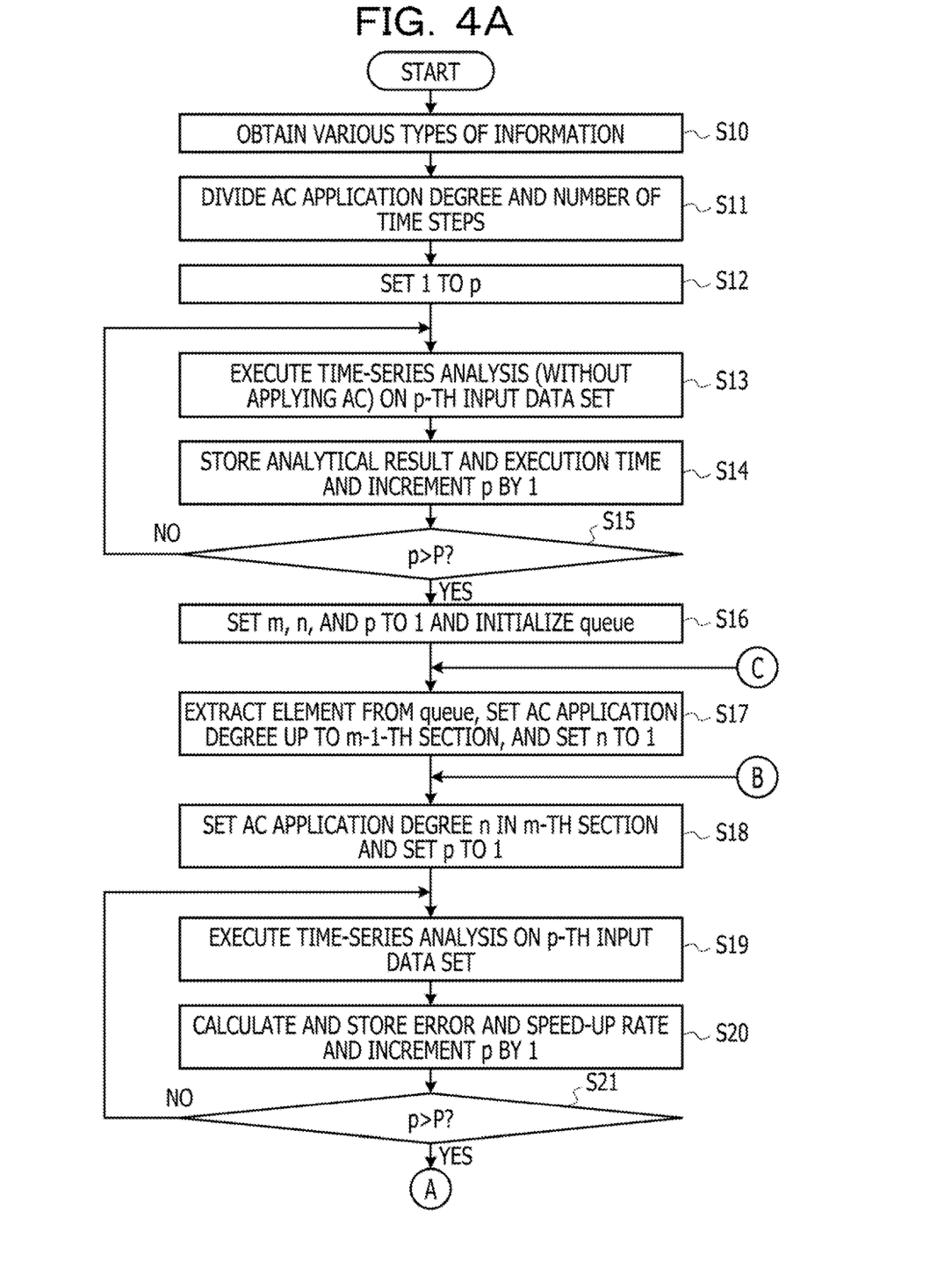
FIG. 4A is a flowchart illustrating a flow of processes of a first example of a time-series analysis.
Figure 4B:
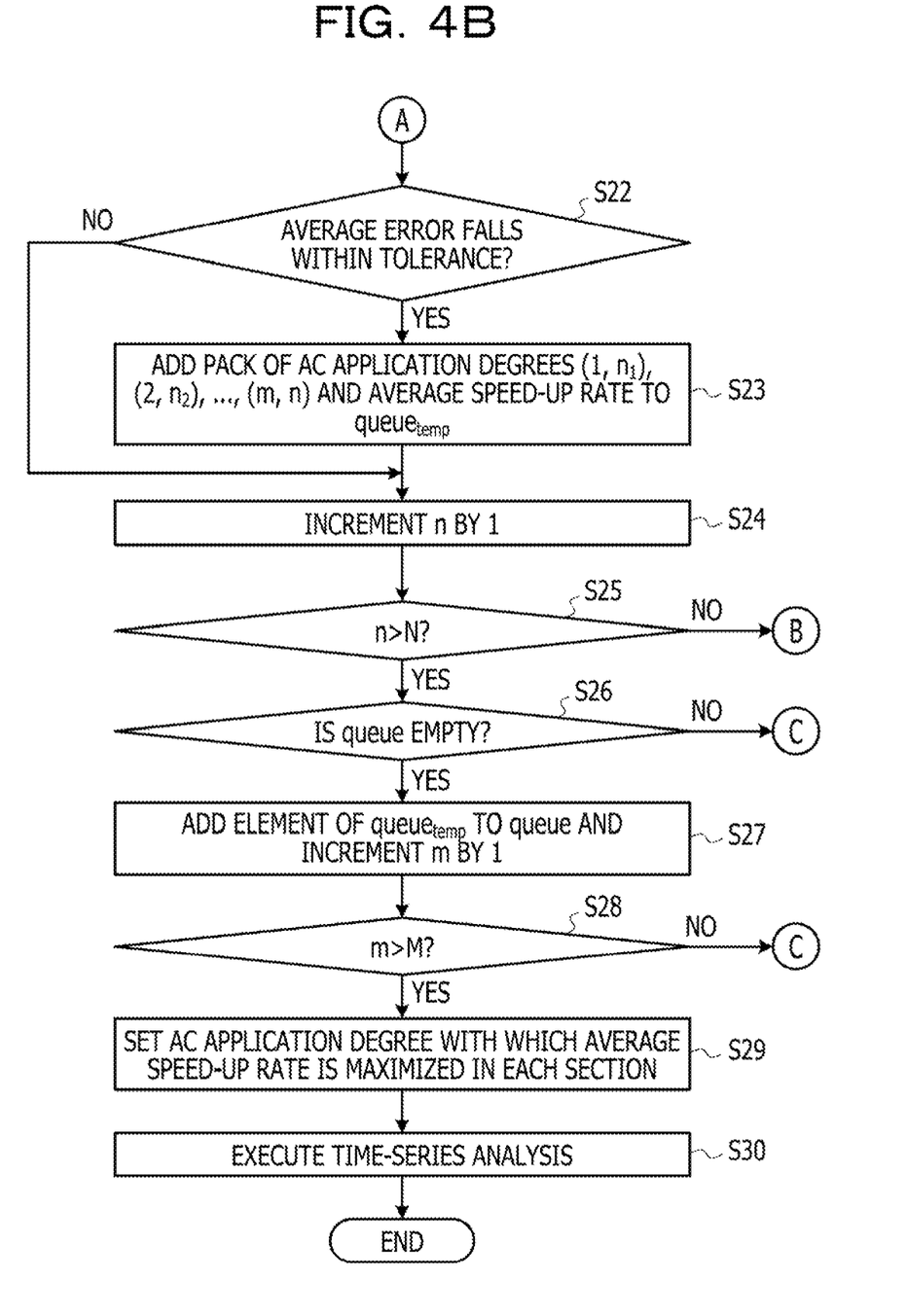
FIG. 4B is a flowchart illustrating a flow of processes of a first example of a time-series analysis.

FIGS. 4A and 4B are flowcharts illustrating a flow of processes of a first example of the time-series analysis.

First, the input unit 31 obtains various types of information (step S10). The various types of information include analytical conditions such as a predetermined number of time steps, the tolerance of the error (accuracy requested by the user), the division number of the AC application degree, the division number of the predetermined number of time steps, and the like. Hereafter, it is assumed that the division number of the AC application degree is N (an integer of 2 or larger) and the division number of the number of time steps is M (an integer of 2 or larger). N may be equal to or different from M.

The AC application degree control unit 33 calculates a plurality of AC application degrees based on the division number of the AC application degree having been input and divides the predetermined number of time steps into a plurality of sections based on the division number of the number of time steps having been input (step S11).

For example, when loop perforation is applied as the approximation calculation method, the skip rate may be used as the AC application degree. In the case where the skip rate is used, the AC application degree control unit 33 may calculate a set of the AC application degrees by, for example, methods similar to the following two examples.

In the first example, the AC application degree control unit 33 calculates a set of N AC application degrees to be applied to a loop (hotspot loop) that takes a longest period of time for processing in the program for a time-series analysis. For example, when N=4, the AC application degree control unit 33 calculates the skip rates of 0, 0.25, 0.5, and 0.75 as four AC application degrees.

In the second example, the AC application degree control unit 33 applies loop perforation to the last section out of the plurality of sections into which the number of time steps is divided, and causes the operation unit 32 to execute the time-series analysis in advance. The AC application degree control unit 33 generates a set P $(=<l_1, r_1>, <l_2, r_2>, \ldots, <l_{|P|}, r_{|P|}>)$ which is a set of a plurality of packs of loops l and skip rates r and is arranged in the order of the effect of applying approximation calculation by, for example, the method according to "Managing Performance vs. Accuracy Trade-offs With Loop Perforation", ESEC/FSE'11, 2011 or the like. The AC application degree control unit 33 generates a set obtained by combining elements (packs of l and r) from the set P as a set of AC application degrees. For example, the AC application degree control unit 33 generates a set S of the AC application degrees=$\{\{p_1\}, \{p_1, p_2\}, \ldots, \{p_1, p_2, \ldots, p_{|P|}\}\}=\{\{<l_1, r_1>\}, \{<l_1, r_1>, <l_2, <r_2>\}, \ldots, \{<l_1, r_1>, <l_2, r_2>, \ldots, <l_{|P|}, r_{|P|}>\}\}$. The top element of the set S applies the skip rate $r_1$ to a single loop $l_1$ and indicates the smallest AC application degree. The last element of the set S applies the skip rates $r_1$ to $r_{|P|}$ to the |P| loops $l_1$ to $l_{|P|}$ and indicates the largest AC application degree. In this case, the division number of the AC application degree N=|P|=|S|(|P| and |S| are the numbers of elements of the sets P and S).

After the process in step S11, the AC application degree control unit 33 sets 1 to the variable p (step S12), selects a p-th input data set from among P input data sets, and causes the operation unit 32 to execute the time-series analysis without applying the approximation calculation (step S13).

The AC application degree control unit 33 stores in the storage unit 34 the analytical result at the end of each section of the time-series analysis and increments the variable p by 1 (step S14). The analytical results stored in a process in step S14 serves as reference data for calculating the error and the speed-up rate due to the approximation calculation.

After the process in step S14, the AC application degree control unit 33 determines whether or not p is greater than P (step S15). When it is determined that p is not greater than P, the AC application degree control unit 33 repeats the processes from step S13.

When it is determined that p is greater than P, the AC application degree control unit 33 sets variables m, n, and p to 1 and initializes a queue that holds a combination of the AC application degrees set for each of the m sections (constructed in the storage unit 34) (step S16). For example, when 1 is set as an initial value of the AC application degree, the AC application degree control unit 33 assigns (1, 1) to the queue.

Next, the AC application degree control unit 33 extracts one of elements from the queue, sets the AC application degree up to an m−1-th section based on the extracted element, and sets the variable n to 1 (step S17). Each element of the queue is a pack of a combination of the AC application degrees set for each of the M sections and the speed-up rate obtained in processing to be later described. However, the speed-up rate is not included in the queue at the time of first processing of step S17. In the first processing of step S17, m=1 and m−1=0. Thus, the AC application degree is not set up to the m−1-th section.

After the process in step S17, the AC application degree control unit 33 sets an AC application degree n (n-th smallest among the N AC application degrees) in an m-th section and sets the variable p to 1 (step S18).

Then, the AC application degree control unit 33 selects a p-th input data set from among the P input data sets and causes the operation unit 32 to execute the time-series analysis up to the m-th section (step S19).

Based on the result of the time-series analysis, the AC application degree control unit 33 calculates, without applying the approximation calculation, the error and the speed-up rate for the result of the time-series analysis on the p-th input data set, stores the calculated error and speed-up rate in the storage unit 34, and increments the variable p by 1 (step S20).

After the process in step S20, the AC application degree control unit 33 determines whether or not p is greater than P (step S21). When it is determined that p is not greater than P, the AC application degree control unit 33 repeats the processes from step S19.

When it is determined that p is greater than P, the AC application degree control unit 33 determines whether or not an average value of the errors respectively obtained for the P input data sets (average error) stored in the storage unit 34 falls within the tolerance of the error (step S22).

When it is determined that the average error falls within the tolerance, the AC application degree control unit 33 performs a process in step S23. In the process in step S23, for example, a pack of $(1, n_1), (2, n_2), \ldots, (m, n)$ and the average speed-up rate is added as an element of a queue$_{temp}$ that stores a pack of the AC application degrees set for the first to meth sections and the average speed-up rate obtained by the time-series analysis up to the m-th section. Here, $n_1$ is an AC application degree set for the first section, $n_2$ is an AC application degree set for the second section, and n is an AC application degree set for the m-th section. When m=1, a pack of (1, n) and the average speed-up rate is added as an element of the queue$_{temp}$. When m=2, a pack of $(1, n_1)$, $(2, n)$ and the average speed-up rate is added as an element of the queue$_{temp}$. The queue$_{temp}$ is constructed in the storage unit 34.

When the AC application degree control unit 33 determines that the average error does not fall within the tolerance in the process in step S22 or after processing in step S23, the AC application degree control unit 33 increments the variable n by 1 (step S24) and determines whether or not n is greater than N (step S25). When it is determined that n is not greater than N, the AC application degree control unit 33 repeats the processes from step S18.

When it is determined that n is greater than N, the AC application degree control unit 33 determines whether or not the queue is empty (step S26). When it is determined that the queue is not empty, the AC application degree control unit 33 repeats the processes from step S17.

When it is determined that the queue is empty, the AC application degree control unit 33 adds each element of the queue$_{temp}$ to the queue and increments the variable m by 1 (step S27).

Then, the AC application degree control unit 33 determines whether or not m is greater than M (step S28). When it is determined that m is not greater than M, the AC application degree control unit 33 repeats the processes from step S17.

When it is determined that m is greater than M, the AC application degree control unit 33 sets, based on the queue, the AC application degree with which the speed-up rate is maximized in each section (step S29). Then, the AC application degree control unit 33 causes the operation unit 32 to execute the time-series analysis on the new input data set (step S30) and ends the analytical process.

The analytical result of the time-series analysis in step S30 may be stored in the storage unit 34 or displayed in the display 24a.

The above-described order of the processes is an example. The order of the processes may be changed.

With a time-series analysis method as described above, effects similar to those of the a time-series analysis method according to the first embodiment may be obtained. In the above example, since the error and the speed-up rate are the average values of the errors and the speed-up rates obtained based on the respective results of the time-series analysis for a plurality of the used input data sets, an influence of a particular input data set may be suppressed. Accordingly, the AC application degree suitable for the time-series analysis for a variety of the input data sets may be set.

(Second Example of the Time-series Analysis)

Figure 5A:
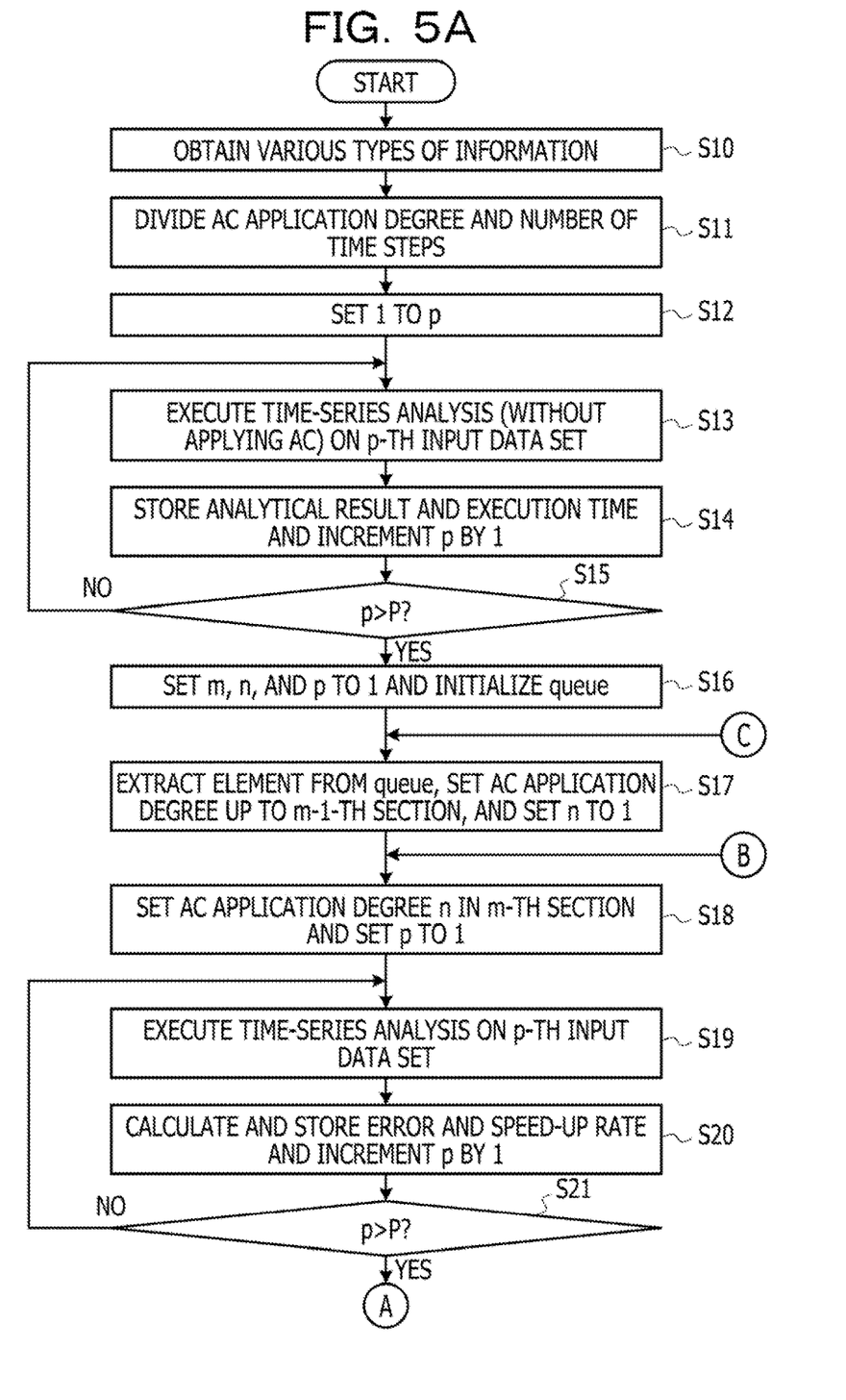
FIG. 5A is a flowchart illustrating a flow of processes of second example of the time-series analysis.
Figure 5B:
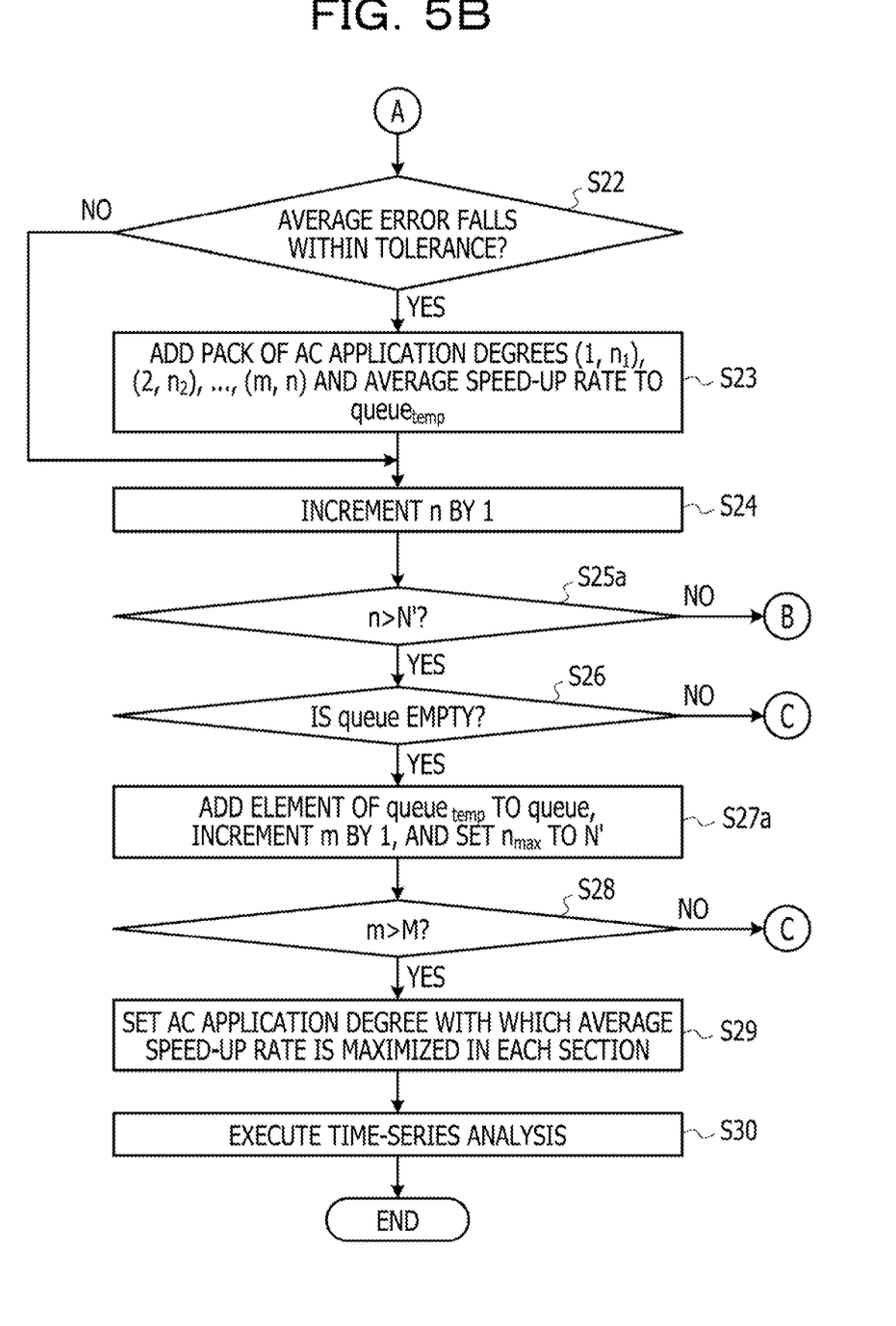
FIG. 5B is a flowchart illustrating a flow of processes of a second example of the time-series analysis.

FIGS. 5A and 5B are flowcharts illustrating a flow of processes of a second example of the time-series analysis.

Processes in steps S25 and S27 of the second example of the time-series analysis are different from those of the first example illustrated in FIGS. 4A and 4B.

In the second example, the AC application degree control unit 33 determines whether or not n is greater than N' (step S25a) instead of the process in step S25 that determines whether or not n is greater than N. N' is the maximum AC application degree ($n_{max}$) out of the AC application degrees n with which the average error falls within the tolerance in the m−1 sections.

Also in the second example, in addition to the process in step S27 of the first example, the AC application degree control unit 33 performs a process for setting $n_{max}$ to N' (step S27a).

The other processes are similar to those in the first example.

As described above, in the second example, the upper limit of the AC application degree set for the m-th section in the time-series calculation is the maximum value of the AC application degree set for the m−1-th section in the time-series analysis in which the average error falls within the tolerance.

In the second example as described above, the effects similar to those of the first example may be obtained. In addition, within a range in which the upper limit is the maximum value of the AC application degree with which the average error falls within the tolerance in a section, the AC application degree in or after this section is set. Accordingly, a search range of the AC application degree to be set may be limited, and the search time may be decreased.

Since the AC application degree to be set tends to decrease toward temporally subsequent sections, the second example as described above is preferable for, for example, a simulation such as convergent calculation using a genetic algorithm. The reason for this is that, in the convergent calculation, it is considered that the application of the approximation calculation has a smaller influence on the final result in a temporally previous time step than in a temporally subsequent time step.

(Third Example of the Time-series Analysis)

Figure 6A:
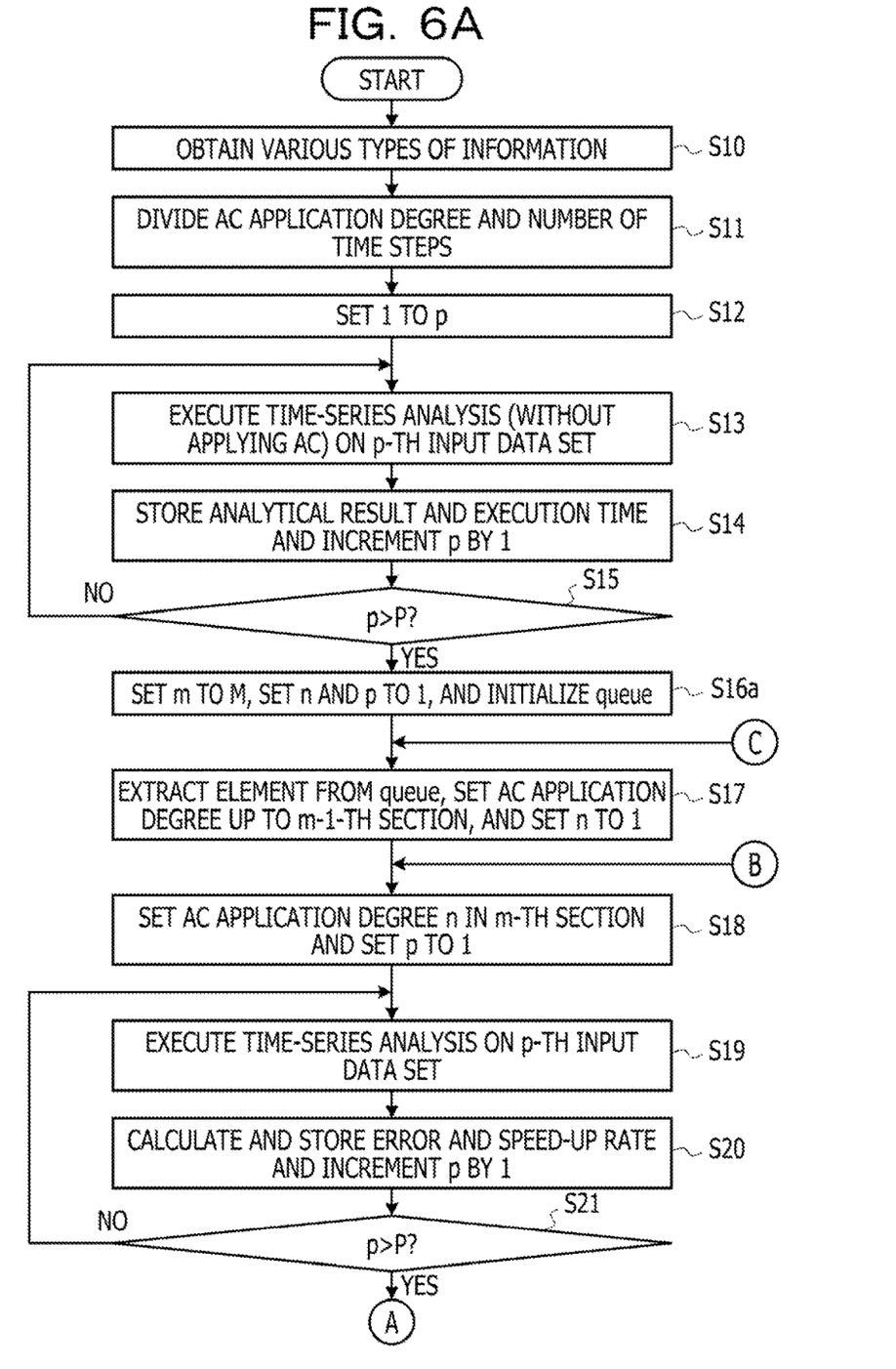
FIG. 6A is a flowchart illustrating a flow of processes of a third example of the time-series analysis.
Figure 6B:
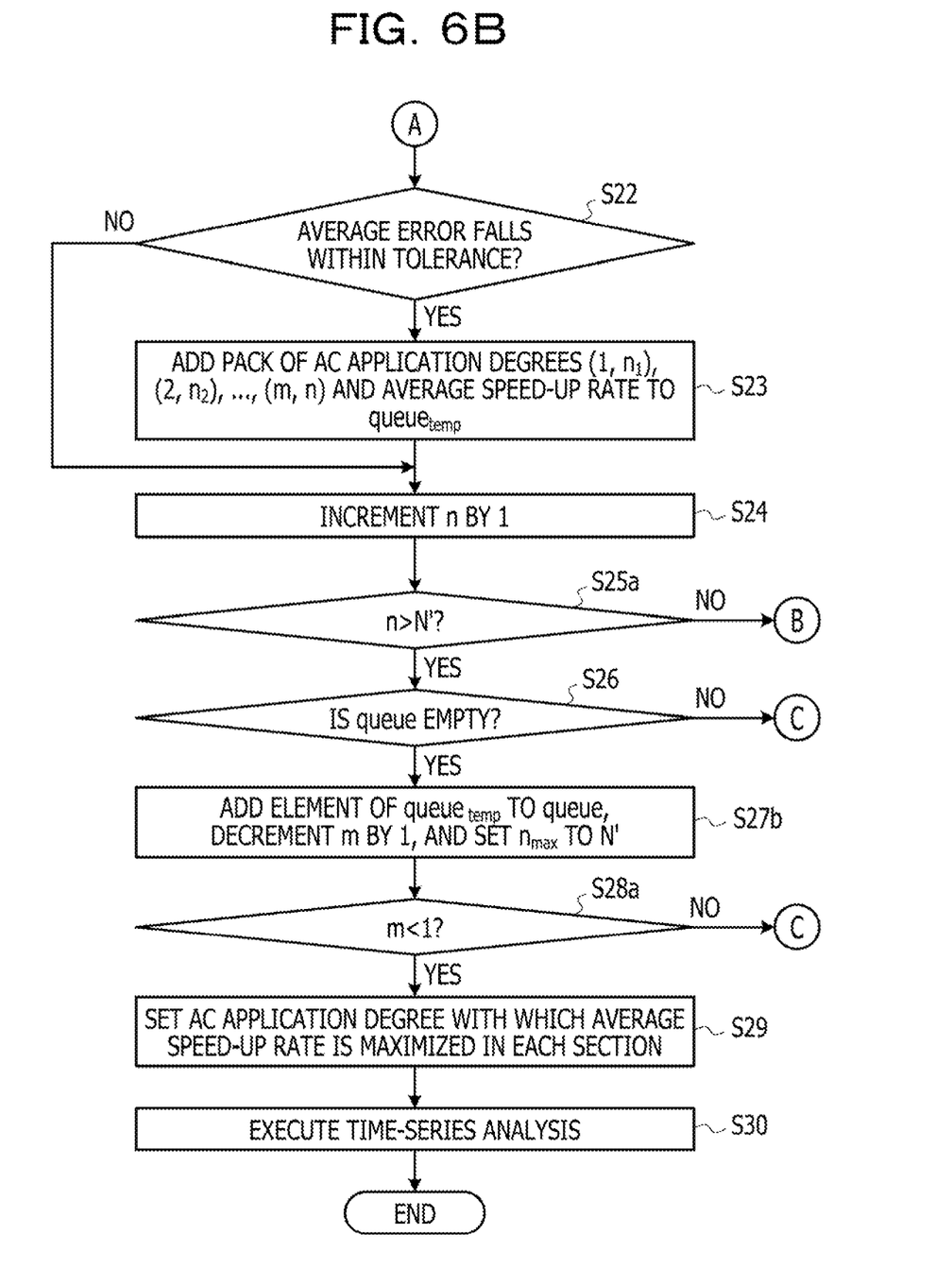
FIG. 6B is a flowchart illustrating a flow of processes of third example of the time-series analysis.

FIGS. 6A and 6B are flowcharts illustrating a flow of processes of a third example of the time-series analysis.

Processes in steps S16, S27a, and S28 of the third example of the time-series analysis are different from those of the second example illustrated in FIGS. 5A and 5B.

In the third example, the AC application degree control unit 33 sets the variable m to M (step S16a) instead of setting the variable m to 1 as in the process in step S16 and decrements the variable m by 1 (step S27b) instead of incrementing the variable m by 1 as in the process in step S27a. In the process in step S16a, initial values of the AC application degrees of the M sections are set when the queue is initialized. For example, (1, 1), (2, 1), . . . , (M, 1) are set. In addition, instead of determining whether or not m is greater than M as in the processing in step S28, the AC application degree control unit 33 determines whether or not m is smaller than 1 (step S28a).

For example, in the third example, a single section is sequentially selected from the last section M toward the analysis start time point side, and the setting process of the AC application degree is performed.

The other processes are similar to those in the second example.

As described above, in the third example, the upper limit of the AC application degree set for the m-th section in the time-series calculation is the maximum value of the AC application degree set for the m+1-th section in the time-series analysis in which the average error falls within the tolerance.

In the third example as described above, the effects similar to those of the second example may be obtained.

Since the AC application degree to be set tends to decrease toward temporally previous sections, the third example as described above is preferable for, for example, a time development simulation such as weather forecast. The reason for this is that, in the time development simulation, it is considered that the application of the approximation calculation has a smaller influence on the final result in a temporally subsequent time step than in a temporally previous time step.

Figure 7:
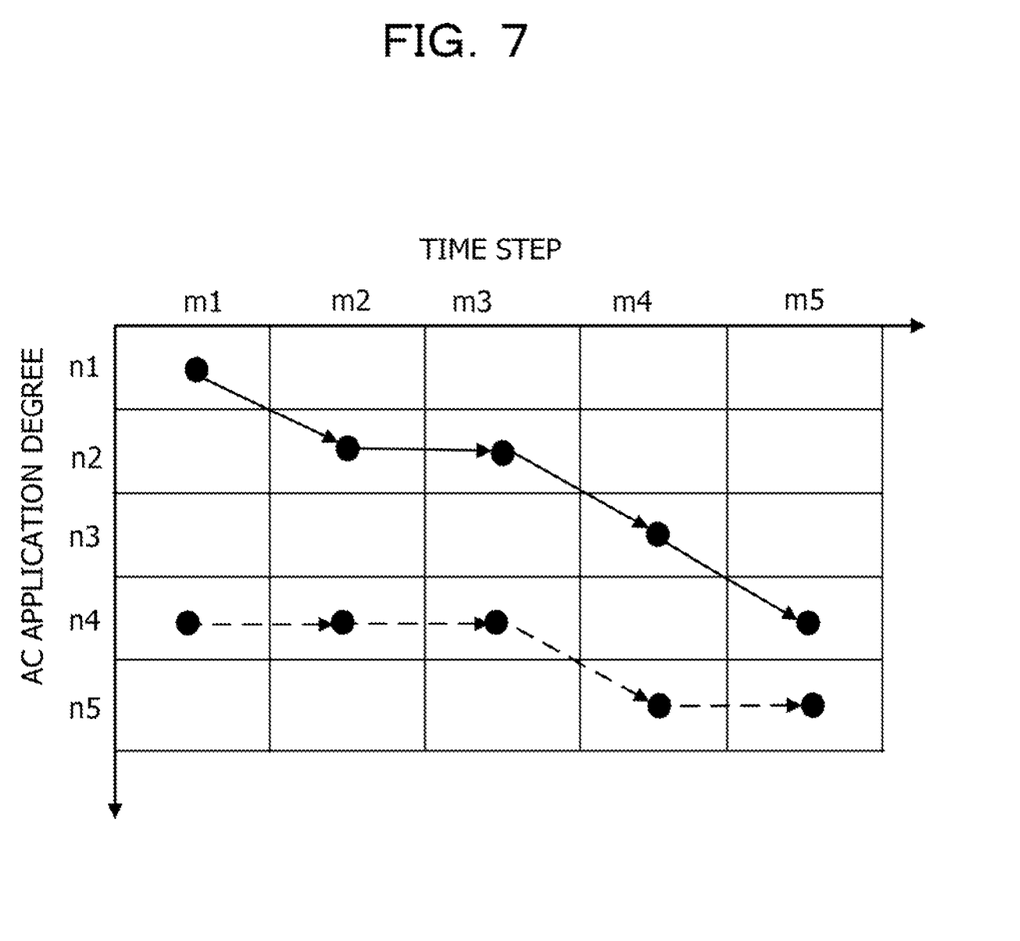
FIG. 7 is a diagram illustrating setting examples of an AC application degree obtained in a third example.

FIG. 7 is diagram illustrating setting examples of the AC application degree obtained in the third example. The setting example represented by dotted arrows is of setting of the AC application degree without consideration for the error and illustrated for comparison.

FIG. 7 is the examples of setting of five AC application degrees n1, n2, n3, n4, and n5 for the sections m1, m2, m3, m4, and m5 obtained by dividing the number of time steps into five. The horizontal axis represents the time step, and the vertical axis represents the AC application degree. Here, n1<n2<n3<n4<n5.

In the case of the setting example such as a case indicated by the dotted arrows, the second largest AC application degree n4 is set for the sections m1 to m3, and the largest AC application degree n5 is set for the sections m4 and m5. When a relatively large AC application degree is set from the top section as described above, although speed-up of the time-series analysis may be expected, the errors may be accumulated to exceed the tolerance.

In contrast, with a method of the third example, the AC application degree that enables further speed-up to be achieved within a range in which the error falls within the tolerance may be set. In the illustrated in FIG. 7, the smallest AC application degree n1 is set for the section m1, and the second smallest AC application degree n2 is set for the sections m2 and m3. The third largest AC application degree n3 is set for the section m4, and the second largest AC application degree n4 is set for the section m5.

As described above, the above processing details may be realized by causing the information processing apparatus 20 to execute the program (the a time-series analysis program).

The program may be recorded on a computer-readable recording medium (such as the recording medium 26a). As the recording medium, for example, any of a magnetic disk, an optical disk, a magneto-optical disk, a semiconductor memory, and the like may be used. Examples of the magnetic disk include an FD and an HDD. Examples of the optical disk includes a CD, a CD-recordable (R)/rewritable (RW), a DVD, and a DVD-R/RW. The program may be recorded and distributed on a portable recording medium. In that case, the program may be copied from the portable recording medium to another recording medium (such as the HDD 23) and executed.

Although an aspect of the time-series analysis program, the time-series analysis method, and the information processing apparatus according to the present disclosure have been described above based on the embodiment, these are merely examples and the present disclosure is not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor included in an apparatus to execute a process, the process comprising:
   selecting a single section from among a plurality of sections obtained by dividing a predetermined number of time steps in a time-series analysis from a top section or a last section toward an analysis end time point side or an analysis start time point side;

performing on a first input data group the time-series analysis from the top section to the selected section when each of a plurality of approximation calculation application degrees indicating a degree of application for approximation calculation in the time-series analysis is set in the selected section;

based on a result of the time-series analysis on the first input data group, for each of the plurality of approximation calculation application degrees is set, calculating an error and an index value for a result of the time-series analysis up to the selected section for the first input data group when the approximation calculation is not applied, the index value indicating a degree of speed-up of an analysis;

storing, in a memory, an approximation calculation application degree in which the error falls within a predetermined range out of the plurality of approximation calculation application degrees, and the index value obtained when the error falls within the predetermined range; and executing the time-series analysis on a second input data group by applying a combination of the approximation calculation application degrees, each of the approximation calculation application degrees includes in the combination correspond to an index value which indicates a highest degree of speed-up in a corresponding one of the plurality of sections out of the index values held in a memory, a plurality of first input data groups including the first data group are used, and the error and the index value are an average value of errors and an average value of index values obtained based on respective results of the time-series analysis for the used plurality of first input data groups.

2. The non-transitory computer-readable storage medium according to claim 1, wherein the selecting, the performing, the calculating and the storing are repeated while changing the single section selected by the selecting.

3. The non-transitory computer-readable storage medium according to claim 1, wherein the selecting, the performing, the calculating, and the storing are repeated a number of predetermined time corresponding to the number of predetermined time steps, and the selecting includes sequentially selecting the single section.

4. The non-transitory computer-readable storage medium according to claim 1, wherein, when the selected section is sequentially selected from the top section toward the analysis end time point side, an upper limit of the plurality of approximation calculation application degrees set for the selected section in time-series calculation is, out of the plurality of approximation calculation application degrees set for another section that is a previous section, a maximum value of the approximation calculation application degrees set for the another section in the time-series analysis in which the error falls within the predetermined range.

5. The non-transitory computer-readable storage medium according to claim 1, wherein, when the selected section is sequentially selected from the last section toward the analysis start time point side, an upper limit of the plurality of approximation calculation application degrees set for the selected section in time-series calculation is, out of the plurality of approximation calculation application degrees set for another section that is a subsequent section, a maximum value of the approximation calculation application degrees set for the another section in the time-series analysis in which the error falls within the predetermined range.

6. A time-series analysis method comprising:

selecting a single section from among a plurality of sections obtained by dividing a predetermined number of time steps in a time-series analysis from a top section or a last section toward an analysis end time point side or an analysis start time point side;

performing on a first input data group the time-series analysis from the top section to the selected section when each of a plurality of approximation calculation application degrees indicating a degree of application for approximation calculation in the time-series analysis is set in the selected section;

based on a result of the time-series analysis on the first input data group, for each of the plurality of approximation calculation application degrees is set, calculating an error and an index value for a result of the time-series analysis up to the selected section for the first input data group when the approximation calculation is not applied, the index value indicating a degree of speed-up of an analysis;

storing, in a memory, an approximation calculation application degree in which the error falls within a predetermined range out of the plurality of approximation calculation application degrees, and the index value obtained when the error falls within the predetermined range; and executing the time-series analysis on a second input data group by applying a combination of the approximation calculation application degrees, each of the approximation calculation application degrees includes in the combination correspond to an index value which indicates a highest degree of speed-up in a corresponding one of the plurality of sections out of the index values held in the memory, a plurality of first input data groups including the first data group are used, and the error and the index value are an average value of errors and an average value of index values obtained based on respective results of the time-series analysis for the used plurality of first input data groups.

7. The time-series analysis method according to claim 6, wherein the selecting, the performing, the calculating and the storing are repeated while changing the single section selected by the selecting.

8. The time-series analysis method according to claim 6, wherein the selecting, the performing, the calculating, and the storing are repeated a number of predetermined time corresponding to the number of predetermined time steps, and the selecting includes sequentially selecting the single section.

9. An information processing apparatus comprising:
a memory; and
a processor coupled to the memory and configured to:
perform a first process, the first process includes:
selecting a single section from among a plurality of sections obtained by dividing a predetermined number of time steps in a time-series analysis from a top section or a last section toward an analysis end time point side or an analysis start time point side,
performing on a first input data group the time-series analysis from the top section to the selected section when each of a plurality of approximation calculation application degrees indicating a degree of application for approximation calculation in the time-series analysis is set in the selected section, based on a result of the time-series analysis on the first input data group, for each of the plurality of approximation calculation application degrees is set, calculating an error and an index value for a result of the time-series analysis up to the selected section for the first input data group when the approximation calculation is not applied, the index value indicating a degree of speed-up of an analysis, and storing in the storage unit an approximation calculation application degree in which the error falls within a predetermined range out of the plurality of approximation calculation application degrees, and the index value obtained when the error falls within the predetermined range; and perform a second process, the second process includes:

executing the time-series analysis on a second input data group by applying a combination of the approximation calculation application degrees, each of the approximation calculation application degrees includes in the combination correspond to an index value which indicates a highest degree of speed-up in a corresponding one of the plurality of sections out of the index values held in the memory, a plurality of first input data groups including the first data group are used, and the error and the index value are an average value of errors and an average value of index values obtained based on respective results of the time-series analysis for the used plurality of first input data groups.

10. The information processing apparatus according to claim 9, wherein the processor repeats the first process while changing the single section selected by the selecting.

11. The information processing apparatus according to claim 9, wherein the processor repeats the first process a number of predetermined times corresponding to the number of predetermined time steps, and the selecting includes sequentially selecting the single section.

\* \* \* \* \*